US005485542A

United States Patent [19]
Ericson

[11] Patent Number: 5,485,542
[45] Date of Patent: Jan. 16, 1996

[54] HEATED FLUID CONTROL VALVE WITH ELECTRIC HEATING ELEMENT AND THERMOCOUPLE WIRING DISPOSED IN ROTATABLE SHAFT

[75] Inventor: Richard D. Ericson, North Andover, Mass.

[73] Assignee: MKS Instruments, Inc., Andover, Mass.

[21] Appl. No.: 276,558

[22] Filed: Jul. 18, 1994

[51] Int. Cl.⁶ ............................. F16K 49/00; F24H 1/00
[52] U.S. Cl. ......................... 392/474; 219/201; 137/341; 251/305
[58] Field of Search .................................... 392/474, 475, 392/480; 219/201, 536; 137/341; 251/305

[56] References Cited

U.S. PATENT DOCUMENTS 5,413,139  5/1995  Kusumoto et al. .................... 137/341

*Primary Examiner*—John A. Jeffery
*Attorney, Agent, or Firm*—Lappin & Kusmer

[57] ABSTRACT

A heated fluid control valve with an electric heating element and a thermocouple disposed in a rotatable support shaft comprises a metallic flapper plate disposed in a fluid passageway and mounted on, and in thermal contact with, an elongated, rotatable metallic shaft that passes laterally through the fluid passageway. The shaft is heated by the internal heating element and, in turn, heats the flapper plate along the entire length of the shaft.

29 Claims, 2 Drawing Sheets

HEATED FLUID CONTROL VALVE WITH ELECTRIC HEATING ELEMENT AND THERMOCOUPLE WIRING DISPOSED IN ROTATABLE SHAFT

The present invention relates generally to a heated flapper valve for regulating fluid flow through a conduit wherein heating means are positioned adjacent to the flapper element thereby enabling the flapper element to be maintained at a relatively constant elevated temperature to prevent condensation along wetted surfaces of the flapper element.

BACKGROUND OF THE INVENTION

Fluid flow control or throttle valves are well-known in the art as a means for regulating rates of fluid flow. One type of fluid flow control device is a so-called flapper valve in which a thin "flapper" or plate-like member is disposed inside a fluid passageway and centrally mounted on a rotatable shaft passing laterally through the interior of the passageway. The plane of the flapper can thus be oriented by rotating the shaft in a clockwise or counterclockwise direction. The flapper is precisely dimensioned so as to close and more or less seal the passageway to stop or at least substantially reduce fluid flow when the plane of the flapper is oriented substantially perpendicular to the longitudinal axis of the passageway. Alternatively, rotating the shaft and the flapper 90° or so such that the plane of the flapper is substantially parallel to the longitudinal axis of the passageway results in opening the passageway so as to permit fluid flow. The simplicity and ease of operation of such flapper valves makes them particularly well suited to regulating fluid flow.

A number of important industrial chemicals exist in the liquid phase at or about normal room temperature and pressure, but transition to the vapor phase under normal atmospheric pressure at elevated temperatures up to about 250° C. For many industrial applications, it is preferred to handle these chemicals in the vapor phase while, at the same time, minimizing excessive, unnecessary inputs of thermal energy. Striking this balance, however, presents special problems in the case of throttle valves for regulating the flow of these vapor-phase chemicals. Unless all wetted surfaces of the valve are maintained at temperatures above the liquid-vapor transition temperature of the chemical being regulated, there is a danger of condensation on a valve interior surface resulting in possible corrosion of the valve, contamination of the fluid stream, and pooling of liquid adversely affecting valve operation.

In the past, this problem has typically been addressed by keeping the regulated fluid at a temperature higher than what might otherwise be required or desired and/or by applying an external heat source to the valve body. The internal flapper element would, in turn, be indirectly heated by a combination of conduction, convection and radiation. Because the flapper element is being heated only indirectly in such constructions, it typically has a lower temperature than other surfaces of the valve interior and therefore presents a prime site for unwanted condensation. Excessive thermal energy is thus required to prevent condensation in such a system.

Greater efficiency and better valve operation could be realized by the direct application of heat to the flapper element. In the past, however, this has not been considered possible because the flapper element must be free to rotate inside the valve body about a relatively narrow support shaft in order to permit valve operation without unduly blocking the fluid passageway when the valve is in the "open" position. No means have heretofore been available for direct application of heat to the internal flapper assembly of a flapper valve because of the accessibility problems.

These and other problems with and limitations of the prior art fluid control valves are overcome with the heated flapper valves of this invention.

OBJECTS OF THE INVENTION

Accordingly, a general object of this invention is to provide a heated fluid flow control valve and a process therefor.

A principal object of this invention is to provide flapper valve apparatus in which all wetted surfaces are maintained at an elevated temperature sufficient to prevent any fluid condensation.

A further object of this invention is to provide an energy-efficient method of heating a flapper valve to a substantially constant and uniform temperature over an extended time period.

Another object of this invention is to provide a flapper valve wherein thermal energy is directly applied to the flapper assembly.

A specific object of this invention is to provide a flapper valve wherein the support shaft for the flapper element comprises means for generating thermal energy which can be directly transferred to the flapper element.

These and other objects and advantages of this invention will be better understood from the following description, which is to be read together with the accompanying drawings.

SUMMARY OF THE INVENTION

The heated flapper valve of this invention generally comprises a metallic flapper plate disposed in a fluid passageway and centrally mounted on, and in direct thermal contact with, a metallic, elongated, rotatable support shaft that passes laterally through the fluid passageway such that rotation of the shaft results in rotating the plane of the flapper plate through an arc of at least about 90° so as to either open or close the passageway to fluid flow. At least one end of the support shaft, or an extension thereof, passes completely through a sidewall that defines the fluid passageway in order to be engaged by external rotation means. The rotatable support shaft further comprises an externally-controlled electrical heating element wherein electrical connections for the heating element and a thermocouple are made through the externally-extending end of the support shaft. Thermal energy from the heated support shaft passes directly to the adjacent flapper plate, principally through conduction, at a rate sufficient to maintain the entire flapper plate at a temperature within a few degrees of the controlled temperature of the support shaft.

DETAILED DESCRIPTION OF THE PREFERRED EMBODIMENTS

Figure 1:
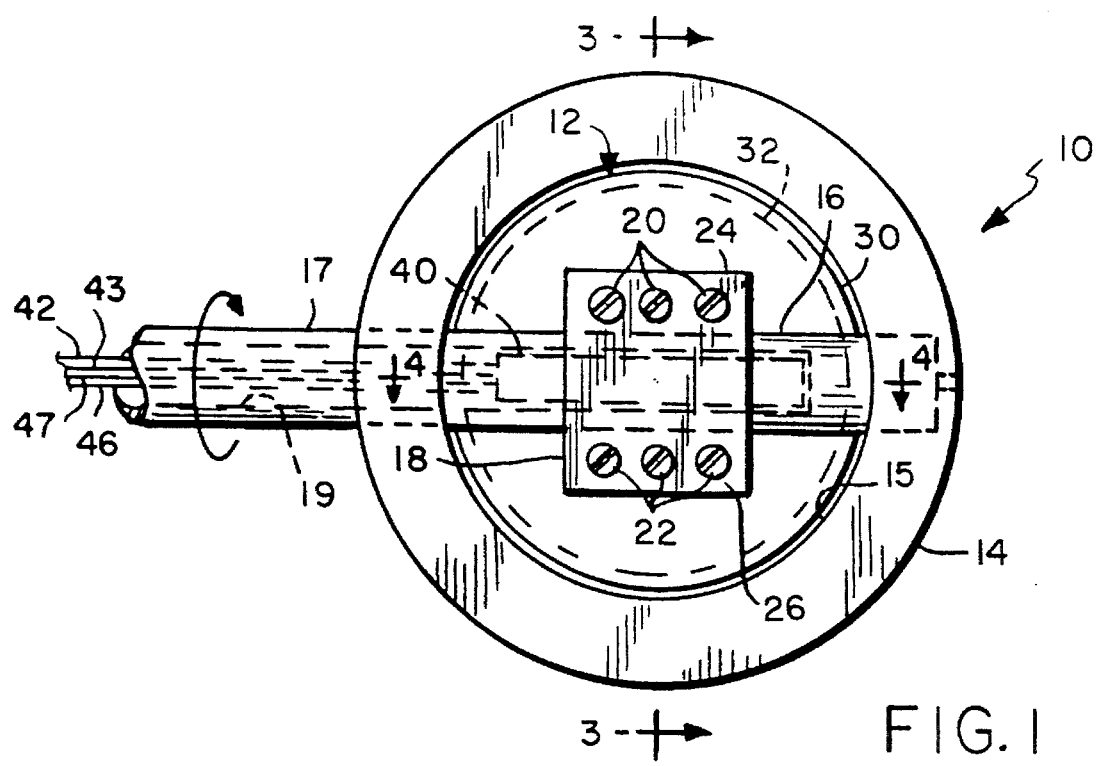
FIG. 1 is a schematic top elevational view of a flapper valve according to the present invention wherein the valve is in the "closed" position.

In FIG. 1, the heated flapper valve of this invention, generally identified by numeral 10, is shown schematically from above in the "closed" position wherein a flapper or plate-like element 12 is disposed in a fluid passageway defined by a tubular sidewall 14 and mounted on a generally rounded rotatable shaft or support member 16 by fastener means 18. Flapper 12, tubular sidewall 14, rotatable support member 16, and fastener means 18 all substantially comprise the same or different materials having a relatively high degree of thermal conductivity, ordinarily a corrosion-resistant metal or metallic alloy such as stainless steel. For purposes of this application, the term "relatively high degree of thermal conductivity" is to be interpreted as meaning a property of thermal conductivity that is significantly greater than that of such nonmetallic substances as typical ceramics, plastics, or wood. Support member 16 further comprises an internal thermal element 40 as hereinafter described.

Figure 2:
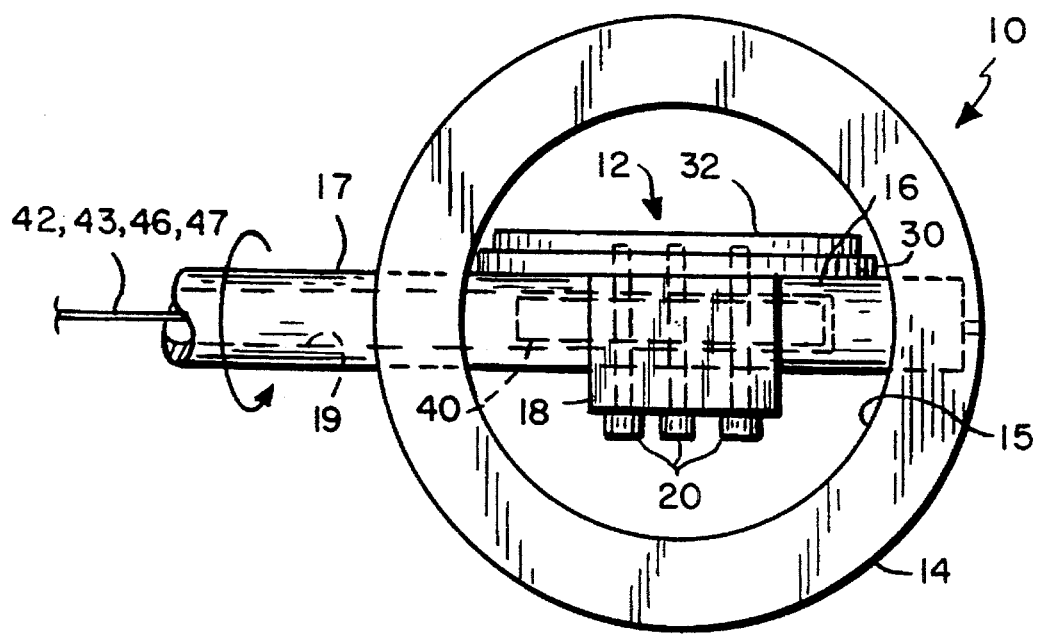
FIG. 2 is a schematic top elevational view of the flapper valve of FIG. 1 wherein the valve is in the "open" position.

In the preferred embodiment of this invention, thermal element 40 comprises electrical heating means and electrical thermocouple control means, each supplied with electrical current through wire pairs 42, 43 and 46, 47 respectively connected to external sources of electric power (not shown) through an external portion 17 of support member 16, or an extension thereof, that extends completely through sidewall 14. The end of support member 16 opposite external portion 17 is rotatably supported, for example in an aperture or indented portion of sidewall 14 opposite from the aperture for external portion 17, as shown in FIGS. 1 and 2. Alternatively, for some applications, the end of member 16 opposite from portion 17 may pass completely through a second sidewall aperture where it is rotatably supported by external support means. Sealing means are also provided at the sidewall apertures to minimize any leakage of fluid when the valve is in use.

Construction and general operation of the heated flapper valve of this invention can be better understood by further reference to FIG. 2, a schematic top view of the valve apparatus of FIG. 1 wherein the flapper 12 is in the "open" position. In FIG. 2, shaft member 16 has been rotated approximately 90° in a clockwise direction (as viewed from the left side of FIG. 1) by means of an external rotation means (not shown) in engagement with external portion 17 of shaft 16. The rotation means may be manual, hydraulic or electronic, and may be activated manually or automatically, for example upon receipt of electronic signals from remote sensors. Such technology is conventional in the art and is not regarded per se as a novel feature of this invention. Rotation of shaft 16 results in rotating flapper 12 such that the plane of flapper 12 is generally parallel to the longitudinal axis of the fluid passageway. In FIG. 2, wire pairs 42, 43 and 46, 47 are shown as a single wire for clarity of illustration.

Looking at FIGS. 1 and 2, it will be seen that in a preferred embodiment of this invention flapper 12 comprises a first face 30 having a diameter substantially equal to the internal diameter of sidewall 14, and a second face 32 having a diameter somewhat less than that of face 30. In the preferred embodiment, flapper 12 comprises a single-piece construction machined so as to define first and second faces as described. The advantage of this construction for the flapper is to achieve greater structural stability as a result of the thicker midsection portion of the flapper while obtaining better sealing and engagement with inner wall 15 of sidewall 14 as a result of the generally thinner perimeter around face 30. It will be understood that, for purposes of illustration, the distance between the outer edge of face 30 and the inner wall 15 of sidewall 14 has been exaggerated in FIGS. 1 and 2. In practice, the outer edge of face 30 will be machined to close tolerances to obtain a generally tight fit inside the fluid passageway when the flapper assembly is in the "closed" position.

Figure 3:
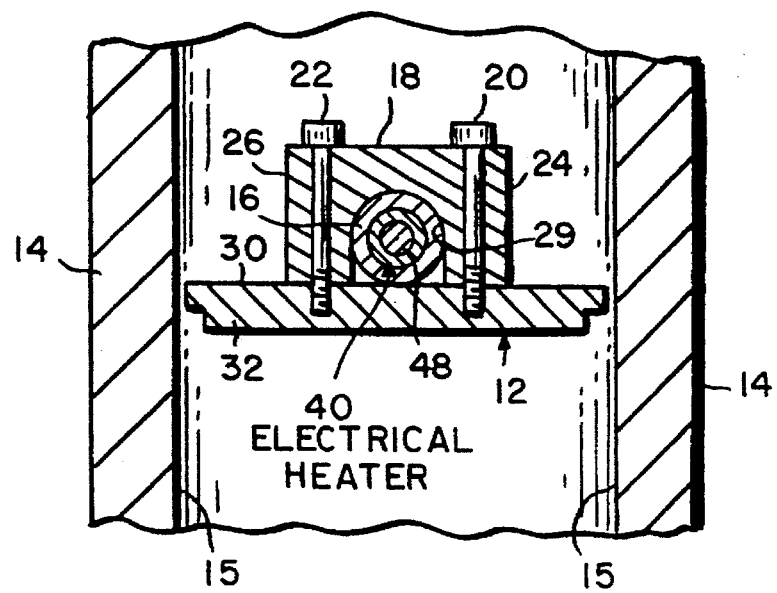
FIG. 3 is a cross-sectional view of the flapper valve of FIG. 1 taken along the line 3—3.

In a preferred embodiment of this invention, fastener means 18 comprises block-like clamp means adapted to engage a central portion of shaft 16, as better seen in FIG. 3, and to be bolted to face 30 of flapper 12 using two or more generally aligned pairs of bolt members 20, 22 along either side of shall 16. In FIGS. 1 and 2, three such aligned pairs of bolt members 20, 22 are shown, but it will be understood that fewer or greater numbers of bolt members could also be used. Like the other components of this assembly, it is preferred that bolt members 20, 22 substantially comprise the same or different materials having a relatively high degree of thermal conductivity, ordinarily a corrosion-resistant metal or metallic alloy such as stainless steel. Bolt members 20, 22 are sized to pass through apertures or bores in the shoulder or flange portions 24, 26 respectively of clamp means 18, and are threaded at their ends to engage threaded apertures in plate member 30, which threaded apertures are aligned with the corresponding bores in clamp 18. The separation between the surface of face 30 and shaft 16, as seen in FIG. 2, is exaggerated for purposes of illustration. It will be understood that, when bolt means 20, 22 are fully tightened, the adjacent surface of face 30 will be drawn into direct contact with shaft 16, as illustrated in FIG. 3.

FIGS. 1 and 2 further show a thermal element 40 disposed inside a central portion of shaft 16 located internally of valve 10. In one embodiment of this invention, thermal element 40 is incorporated directly inside shaft 16. In an alternative embodiment, as illustrated in FIGS. 1, 2 and 4, shaft 16 comprises an axial bore 19 extending from the end of external shaft portion 17 into the interior of valve 10, and thermal element 40 comprises a separate component comprising heating and heat monitoring means enclosed in a housing adapted to fit inside the axial bore 19 of shaft 16.

FIG. 3, a cross-sectional view of the flapper valve of FIG. 1 taken along the line 3—3, better illustrates a preferred embodiment for releasably fastening flapper 12 to shaft 16. More particularly, a block-like clamp member 18 is adapted to engage shaft 16 by means of an open-sided, centrally-located channel 29. It will be understood that, as shown in FIG. 3, the space inside channel 29 on either side of shaft 16 has been exaggerated for purposes of illustration. In practice, the size and shape of channel 29 will be machined to close tolerances so as to securely engage shaft 16 and maintain it in thermal engagement with the adjacent surface of flapper 12 when the bolt members 20, 22 are tightened. Similarly, the distance between the circumferential edge of flapper 12 and inner wall 15 of sidewall 14 has been exaggerated here for illustrative purposes. As previously described, aligned pairs of bolt members 20, 22 pass through bores in flange portions 24, 26 respectively of clamp 18, and are threaded into corresponding threaded apertures in the adjacent surface of flapper 12. The advantage of the foregoing means for fastening flapper 12 to shaft 16 is that the resulting apparatus is easily disassembled for periodic cleaning and maintenance. While it is within the scope of this invention to permanently secure flapper 12 to shaft 16, for example wherein the fastening means comprise welding shaft 16 or clamp 18 to the adjacent surface of flapper 12, such a construction is not easily serviceable.

It will be apparent from FIG. 3 that thermal energy, produced by thermal element 40 inside the central portion of shaft 16, is transferred efficiently by conduction through the heat-conductive shell of shaft 16 surrounding element 40 directly to flapper 12. In addition, thermal energy is transferred by conduction to clamp 18 and to bolt members 20, 22, from which it is in turn transferred to flapper 12 at the respective surfaces where clamp 18 and bolt members 20, 22 thermally engage flapper 12. Because all of the component parts of this flapper assembly (i.e., flapper 12, shaft 16, clamp 18, and bolts 20, 22) substantially comprise materials, such as metals and metallic alloys, having a relatively high degree of thermal conductivity, and further because all components have been machined to provide close tolerances and good physical and thermal contact, it has been found that, in actual use, all parts of the flapper assembly, including even the outer periphery of flapper 12, can be maintained within a range of about ±3°–5° C. of the temperature of thermal element 40. This is a wholly surprising and unexpected finding which is at the heart of the present invention.

Figure 4:
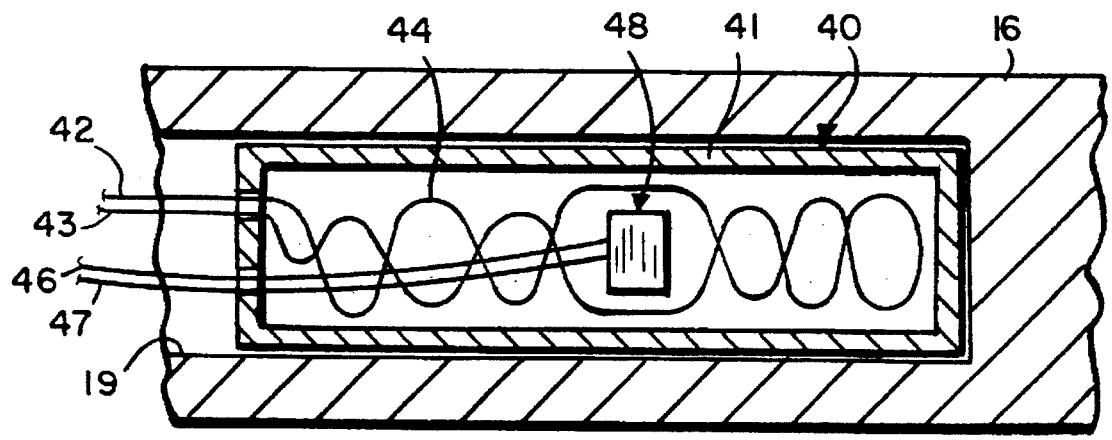
FIG. 4 is an enlarged cross-sectional view of just the shaft portion of FIG. 1 taken along the line 4—4.

FIG. 4, an enlarged., cross-sectional view of just the shaft portion of FIG. 1 taken along the line 4—4, better illustrates the construction of a support shaft 16 comprising heating and heat monitoring means in accordance with one embodiment of this invention. As previously described, FIGS. 1, 2 and 4 illustrate an embodiment wherein shaft 16 comprises a centrally-located axial bore 19 adapted to receive a separate thermal element 40. As seen in FIG. 4, thermal element 40 comprises housing means 41, and electrical heating means 44 and electrical heat monitoring means 48 housed inside housing means 41. The heating means 44 and heat monitoring means 48 are connected respectively to external sources of electrical power via wire means 42, 43 and 46, 47 extending through axial bore 19.

In a preferred embodiment, as illustrated schematically in FIG. 4, the electrical heating means 44 comprises an electrical resistance element, shown as a coiled wire member. Also in a preferred embodiment, as illustrated schematically in FIG. 4, the electrical monitoring means 48 comprises a thermocouple element centrally located in an open region of thermal element 40 between proximal and distal portions of the electrical resistance element. Based on signals received from monitoring means 48, the amount of electrical energy fed to resistance element 44 may be continuously or intermittently adjusted up or down in order to maintain thermal element 40 substantially at a constant, elevated temperature up to about 250° C. over an extended period of time.

Housing means 41 substantially comprises a material having a relatively high degree of thermal conductivity, such as a metal or metallic alloy. For example, housing means 41 may comprise stainless steel or Incoloy, a registered trademark of Inco Alloys International of Huntington, W.V. Because housing means 41 is wholly contained inside the surrounding shell of support shaft 16 and, therefore, is not exposed to the regulated fluid, corrosion-resistance is less important as a factor in choosing the material for housing means 41 than it is in selecting the materials for the other components of the flapper assembly, each of which has at least some wetted surface area when the valve is in use. Thus, housing means 41 may be fabricated from a material different from the other flapper components based on better thermal conductivity characteristics. Thermal elements suitable for use with the present invention are commercially available under the tradename Firerod, manufactured by the Watlow Company of St. Louis, Mo.

As previously noted, in FIG. 4 the open spaces between the outer wall of housing means 41 and the wall of axial bore 19 have been exaggerated for purposes of illustration. In practice, axial bore 19 will be machined to close tolerances so as to achieve a good, tight fit for thermal member 40 and good thermal engagement between the outer wall of housing means 41 and the wall of bore 19. Mechanical or, in some cases, appropriate adhesive means for additionally securing thermal element 40 inside bore 19 are also within the scope of this invention.

In an alternative embodiment, support shaft 16 may be fabricated as a single-piece configuration incorporating thermal element 40 therein, instead of the two piece construction described above and as shown in FIGS. 1, 2 and 4. The advantage of this alternative configuration is that it eliminates the need to machine a proper-sized bore in the shaft and to secure the thermal element inside the bore. On the other hand, with the single-piece configuration, failure of the heating or heat monitoring elements would necessitate disassembly of the valve apparatus and replacement of the entire support shaft.

As previously discussed, the preferred materials for fabricating the components of the heated flapper valves of this invention are those having a relatively high degree of thermal conductivity. Such materials include metals and metallic alloys, for example stainless steel and Incoloy. In addition, aluminum; Inconel, another registered trademark of Inco Alloys, International; and Hastalloy, a registered trademark of Haynes International of Kokomo, Ind., are among materials that could be used for the components of the present valve apparatus.

Although especially designed for regulating the flow of liquid-phase substances that are in the vapor state at an elevated temperature, the heated flapper valves of this invention may be adapted for use with both gaseous and liquid fluid flow. The valves of this invention may also be made smaller or larger to accommodate different fluid flow rates.

Since other changes and modifications may be made in the above-described apparatuses and processes without departing from the scope of the invention herein involved, it is intended that all matter contained in the above-description shall be interpreted in an illustrative and not in a limiting sense.

Having described the invention, what is claimed is:

1. Fluid flow control apparatus comprising a fluid passageway comprising a sidewall defining a fluid inlet and a fluid outlet, and control means disposed in said passageway between said inlet and outlet, said control means comprising: (a) thermally conductive, generally rounded flapper plate means adapted to at least partially seal said passageway when oriented in a first direction and to open said passageway for fluid flow when oriented in a second direction; (b) an elongated, thermally conductive, substantially linear support member completely passing laterally through said fluid passageway so as to engage said sidewall at opposite sides thereof so as to permit at least limited rotation about its central, longitudinal axis, at least one of the support member ends being an external end terminating externally of said sidewall; further wherein said support member comprises substantially linear electrical heating and heat monitoring means disposed in the interior of said support member in thermal engagement therewith so as to heat said support member; and (c) fastener means for mounting said plate means along a diametral portion thereof on and in thermal engagement with said support member along substantially the entire length of said support member inside said passageway so as to provide a heat source for said plate means along said entire diametral portion of said plate means.

2. Apparatus according to claim 1 wherein said heating means comprises electrical heating means located in the interior of the portion of said support member which is inside said passageway.

3. Apparatus according to claim 2 further wherein said electrical heating means comprises at least a resistance element connected to an external source of electric current by wire means connected through said external end of the support member.

4. Apparatus according to claim 1 wherein said heat monitoring means comprises thermocouple means located in the interior of the portion of said support member which is inside said passageway.

5. Apparatus according to claim 4 further wherein said thermocouple means comprises at least a thermocouple connected to an external source of electric current by wire means connected through said external end of the support member.

6. Apparatus according to claim 1 wherein said plate means and said support member are substantially of metallic construction.

7. Apparatus according to claim 6 wherein said plate means and said support member comprise stainless steel.

8. Apparatus according to claim 1 wherein said support member comprises an axial bore commencing at said external end and terminating before the opposite end, further wherein said heating and heat monitoring means comprise a thermal member adapted to be received inside the axial bore of said support member.

9. Apparatus according to claim 8 further wherein said thermal member comprises housing means, at least an electrical resistance element and at least a thermocouple housed inside said housing means, and electrical connections to said resistance element and said thermocouple being made through said external end of said support member.

10. Apparatus according to claim 9 further wherein said housing means comprises a material having a relatively high degree of thermal conductivity.

11. Apparatus according to claim 9 further wherein said housing means is substantially of metallic construction.

12. Apparatus according to claim 11 wherein said housing means comprises stainless steel or Incoloy.

13. Apparatus according to claim 1 wherein said support member comprises housing means, and said heating and heat monitoring means comprise, respectively, at least an electrical resistance element and at least a thermocouple housed inside said housing means, further wherein electrical connections to said resistance element and said thermocouple are made through said external end of said support member.

14. Apparatus according to claim 13 further wherein said housing means comprises stainless steel or Incoloy.

15. In a fluid control flapper valve apparatus comprising a disc mounted on a rotatable support shaft, the disc being disposed inside a fluid conduit and adapted to be opened or closed to fluid flow by rotation of said support shaft, the improvements comprising: (a) a thermally conductive, substantially linear support shaft passing completely through said fluid conduit so as to engage the wall of said conduit at opposite sides thereof and fastened in engagement with a face of said disc along substantially the entire length of said shaft inside said fluid conduit; and (b) substantially linear electrical heating and heat monitoring means located inside said support shaft wherein electrical connections to said heating and heat monitoring means are made through an externally-extending end of said support shaft whereby heat is transferred from said shaft to said disc along an entire diametral portion of said face of said disc.

16. Apparatus according to claim 15 wherein said heating and heat monitoring means comprise, respectively, at least an electrical resistance element and at least a thermocouple.

17. Apparatus according to claim 15 wherein said disc and said support shaft substantially comprise materials having a relatively high degree of thermal conductivity.

18. Apparatus according to claim 15 wherein said disc and said support shaft comprise stainless steel.

19. Apparatus according to claim 15 wherein said support shaft comprises an axial bore commencing at an external end of said support shaft and terminating before the opposite end, and said heating and heat monitoring means comprise a thermal element adapted to be received in the axial bore of said support shaft.

20. Apparatus according to claim 19 further wherein said thermal member comprises housing means and, housed inside said housing means, at least an electrical resistance element and at least a thermocouple.

21. Apparatus according to claim 20 further wherein said housing means comprises a material having a relatively high degree of thermal conductivity.

22. Apparatus according to claim 20 further wherein said housing is substantially of metallic construction.

23. Apparatus according to claim 22 wherein said housing means comprises stainless steel or Incoloy.

24. A method for maintaining the flapper assembly of a flapper valve for regulating fluid flow through a passageway at a substantially constant and uniform elevated temperature, said method comprising: (a) providing substantially linear electrical heating and heat monitoring means inside a substantially linear metallic support shaft that passes laterally completely through said passageway; (b) fastening said support shaft to the metallic flapper portion of the flapper assembly such that the shaft and flapper are in thermal engagement along substantially the entire length of the support shaft inside said passageway; (c) making electrical connections from said heating and heat monitoring means to an external power source through an externally-extending portion of said support shaft; (d) providing electrical power to said heating means to bring the flapper assembly to a predetermined elevated temperature; and (e) monitoring the temperature of the flapper assembly and supplying additional power as needed to said heating means to maintain said temperature within a predetermined range.

25. Fluid flow control apparatus comprising a fluid passageway comprising a sidewall defining a fluid inlet and a fluid outlet, and control means separating said inlet and outlet, said control means comprising: (A) plate means adapted to at least partially seal said passageway when oriented in a first direction and to open said passageway for fluid flow when oriented in a second direction; (B) an elongated support member passing laterally through said fluid passageway, said support member being engaged on opposite ends thereof so as to permit at least limited rotation about its central, longitudinal axis, at least one of said ends being an external end terminating externally of said sidewall; further wherein said support member comprises heating and heat monitoring means; and (C) fastener means for mounting said plate means on and in thermal engagement with said support member wherein said fastener means comprising:

(a) a clamp member comprising an open channel portion along a first clamp face adapted to receive said support member; and flange means adjoining the edges of said channel portion, each of said flange means comprising a surface along said first clamp face adapted to thermally engage a surface of said plate means, said flange means further comprising a plurality of flange apertures passing therethrough in alignment with corresponding threaded apertures in said surface of said plate means; and (b) bolt means adapted to pass through said flange apertures and engage said threaded apertures so as to secure said clamp to said plate means when said support means is disposed in said channel adjacent to said surface of said plate means.

26. Apparatus according to claim 25 wherein said plate means, said support member, said clamp means and said bolt means comprise materials having a relatively high degree of thermal conductivity.

27. Apparatus according to claim 25 wherein said heating means comprises at least a resistance element connected to an external source of electric current by heating wire means, further wherein said heat monitoring means comprises at least a thermocouple connected to an external source of electric current by thermocouple wire means, said heating wire means and said thermocouple wire means being connected through said external end of the support member.

28. In a fluid control flapper valve apparatus comprising plate means mounted on a rotatable support shaft, the plate means being disposed inside a fluid conduit and adapted to be opened or closed to fluid flow by rotation of said support shaft, the improvements comprising:

(a) clamp means for mounting said plate means on said support shaft, said clamp means comprising at least a fastener member comprising an open channel and shoulders on either side of said channel, said shoulders being adapted to rest on a surface of said plate means, and said channel being adapted to hold said shaft in contact with said plate means surface when said shoulders are resting on said surface, each of said shoulders further comprising a plurality of bores extending therethrough substantially perpendicular to said surface, and connection means adapted to pass through said shoulder bores and to engage said plate means so as to secure said fastener member to said plate means when said shaft is disposed in said channel; and (b) electrical heating and heat monitoring means located inside said support shaft wherein electrical connections to said heating and heat monitoring means are made through an externally-extending end of said support shaft.

29. Apparatus according to claim 28 wherein said plate means, said support shaft, said fastener member and said connection means comprise materials having a relatively high degree of thermal conductivity.

* * * * *